(12) United States Patent
Gillen et al.

(10) Patent No.: US 10,828,940 B2
(45) Date of Patent: Nov. 10, 2020

(54) METHOD OF DECREASING TIRE PRESSURE (71) Applicant: DANA HEAVY VEHICLE SYSTEMS GROUP, LLC, Maumee, OH (US)

(72) Inventors: Kurt P. Gillen, Perrysburg, OH (US); Venkata Ramakanth Kona, Maumee, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 237 days.

(21) Appl. No.: 15/576,072

(22) PCT Filed: May 18, 2016

(86) PCT No.: PCT/US2016/033082
§ 371 (c)(1),
(2) Date: Nov. 21, 2017

(87) PCT Pub. No.: WO2016/191174
PCT Pub. Date: Dec. 1, 2016

(65) Prior Publication Data
US 2018/0141393 A1 May 24, 2018

Related U.S. Application Data (60) Provisional application No. 62/165,473, filed on May 22, 2015.

(51) Int. Cl.
*B60C 23/00* (2006.01)
*B60G 17/052* (2006.01)
*F16K 11/06* (2006.01)
*B60G 17/015* (2006.01)
*G05D 16/16* (2006.01)
*G05D 16/20* (2006.01)
*F16K 1/12* (2006.01)

(52) U.S. Cl.
CPC .......... *B60C 23/003* (2013.01); *B60C 23/001* (2013.01); *B60G 17/0155* (2013.01);
(Continued)

(58) Field of Classification Search
CPC ..... B60C 23/003; B60C 23/001; F16K 1/126; F16K 11/07; Y10T 137/2544;
(Continued)

(56) References Cited

U.S. PATENT DOCUMENTS 3,704,720 A   12/1972 Kaiser
4,754,792 A *  7/1988 Braun .................. B60C 23/003
                                                137/224

(Continued)

FOREIGN PATENT DOCUMENTS

WO   2015/017509 A1   2/2015

OTHER PUBLICATIONS

European Patent Office, International Search Report with Written Opinion issued in PCT/US2016/033082, dated Jul. 26, 2016, 11 pages, European Patent Office, Rijswijk, Netherlands.

*Primary Examiner* — Atif H Chaudry
(74) *Attorney, Agent, or Firm* — McCoy Russell LLP (57) ABSTRACT A method of decreasing tire pressure includes opening a wheel valve (22) to allow pressurized air from a tire (10) to be directed to a first valve assembly (14) and to atmosphere. A target pressure is selected for a fluid control conduit (28). The fluid conduit (28) is in fluid communication with the first valve assembly (14) and a second or control valve assembly (30). The pressure in the fluid conduit (28) is measured. If the measured pressure is greater than the target pressure, then the second valve assembly (30) is de-energized. If the measured pressure is less than the target pressure, then the second valve assembly (30) is energized. A valve (42) prone to leak under very low temperatures may be subjected to repeated cycles of pressure application and pressure release in order to form a fluid-tight seal.

18 Claims, 3 Drawing Sheets (52) U.S. Cl.
CPC ..... *B60G 17/0526* (2013.01); *B60G 17/0528* (2013.01); *F16K 11/06* (2013.01); *G05D 16/166* (2013.01); *G05D 16/2033* (2013.01); *F16K 1/126* (2013.01); *Y10T 137/2544* (2015.04); *Y10T 137/86919* (2015.04)

(58) Field of Classification Search
CPC .......... Y10T 137/86919; G05D 16/166; B60G 17/0528; B60G 17/0155; B60G 17/0526
See application file for complete search history.

(56) References Cited

U.S. PATENT DOCUMENTS

| | | | |
|---|---|---|---|
| 4,905,742 A | | 3/1990 | Mohs |
| 5,249,609 A | * | 10/1993 | Walker .................. B60C 23/003 141/1 |
| 5,309,969 A | | 5/1994 | Mittal |
| 5,540,268 A | | 7/1996 | Mittal |
| 5,674,332 A | * | 10/1997 | Battocchio ............ B60C 23/003 152/416 |
| 6,894,607 B1 | | 5/2005 | Claussen et al. |
| 6,943,673 B2 | * | 9/2005 | Skoff .................... B60C 23/003 137/224 |
| 7,265,659 B2 | | 9/2007 | Claussen et al. |
| 7,273,082 B2 | | 9/2007 | White et al. |
| 7,538,661 B2 | | 5/2009 | Claussen et al. |
| 7,926,507 B2 | | 4/2011 | Wetsch et al. |
| 8,424,552 B2 | | 4/2013 | Wetsch et al. |
| 9,346,329 B2 | | 5/2016 | Keane |
| 9,387,731 B2 | | 7/2016 | Kranz |
| 2014/0076456 A1 | | 3/2014 | Kranz |
| 2015/0136270 A1 | | 5/2015 | Keane |
| 2016/0207365 A1 | | 7/2016 | Gillen et al. |

* cited by examiner

METHOD OF DECREASING TIRE PRESSURE

CROSS-REFERENCE TO RELATED APPLICATION

This application is claiming the benefit, under 35 U.S.C. 119(e), of the provisional U.S. patent application which was granted Ser. No. 62/165,473 and filed on May 22, 2015, the entire disclosure of which is hereby incorporated by reference.

BACKGROUND OF THE INVENTION

The invention relates to a method of decreasing tire pressure.

Tire inflation systems are utilized to adjust the tire pressure of one or more tires on a vehicle to provide the vehicle with versatility for differing terrain types or to reduce maintenance requirements. For example, a tire pressure can be decreased by a tire inflation system to provide additional traction for the vehicle and may be increased to reduce a rolling resistance of the vehicle. Further, utilizing a tire inflation system may eliminate the need to manually check the tire pressure of each tire and manually adjust the tire pressure when needed.

Modern tire inflation systems require complex valving systems. The valves and associated pneumatics used in such systems may perform unreliably when exposed to certain tire pressure conditions such as a low tire pressure and/or certain environmental conditions such as cold temperatures. For example, when the ambient temperature is −40° C., one or more components of a valve included in the tire inflation system may not seal properly. If the seal is not provided, then pressurized air may accumulate in portions of the tire inflation system where it is not desired. Under these conditions, decreasing the tire pressure may be difficult to achieve when a lower tire pressure is desired.

Therefore, it would be advantageous to provide a method of decreasing tire pressure that could be utilized with an existing tire inflation system and that enables tire pressure to be decreased even under the conditions discussed above.

BRIEF SUMMARY OF THE INVENTION

Embodiments of a method of decreasing tire pressure are provided.

In an embodiment, the method of decreasing tire pressure comprises opening a wheel valve to allow pressurized air from a tire to be directed to a first valve assembly and to atmosphere. A target pressure is selected for a fluid conduit. The fluid conduit is in fluid communication with the first valve assembly and a second valve assembly. The pressure in the fluid conduit is measured. If the measured pressure is greater than the target pressure, then the second valve assembly is de-energized. If the measured pressure is less than the target pressure, then the second valve assembly is energized.

In another embodiment, the method of decreasing tire pressure comprises selecting a target tire pressure for a tire. When it is determined that a tire pressure of the tire is greater than the target tire pressure, opening a wheel valve to allow pressurized air from the tire to be directed to a first valve assembly and to atmosphere. A target pressure is selected for a fluid conduit. The fluid conduit is in fluid communication with the first valve assembly and a second valve assembly. The pressure in the fluid conduit is measured. If the measured pressure is greater than the target pressure, then the second valve assembly is de-energized. If the measured pressure is less than the target pressure, then the second valve assembly is energized.

BRIEF DESCRIPTION OF THE SEVERAL VIEWS OF THE DRAWINGS

The above, as well as other advantages of the process will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific assemblies and methods illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise. Also, although they may not be, like elements in various embodiments may be commonly referred to with like reference numerals within this section of the application.

A method of decreasing tire pressure is described herein.

Figure 1:
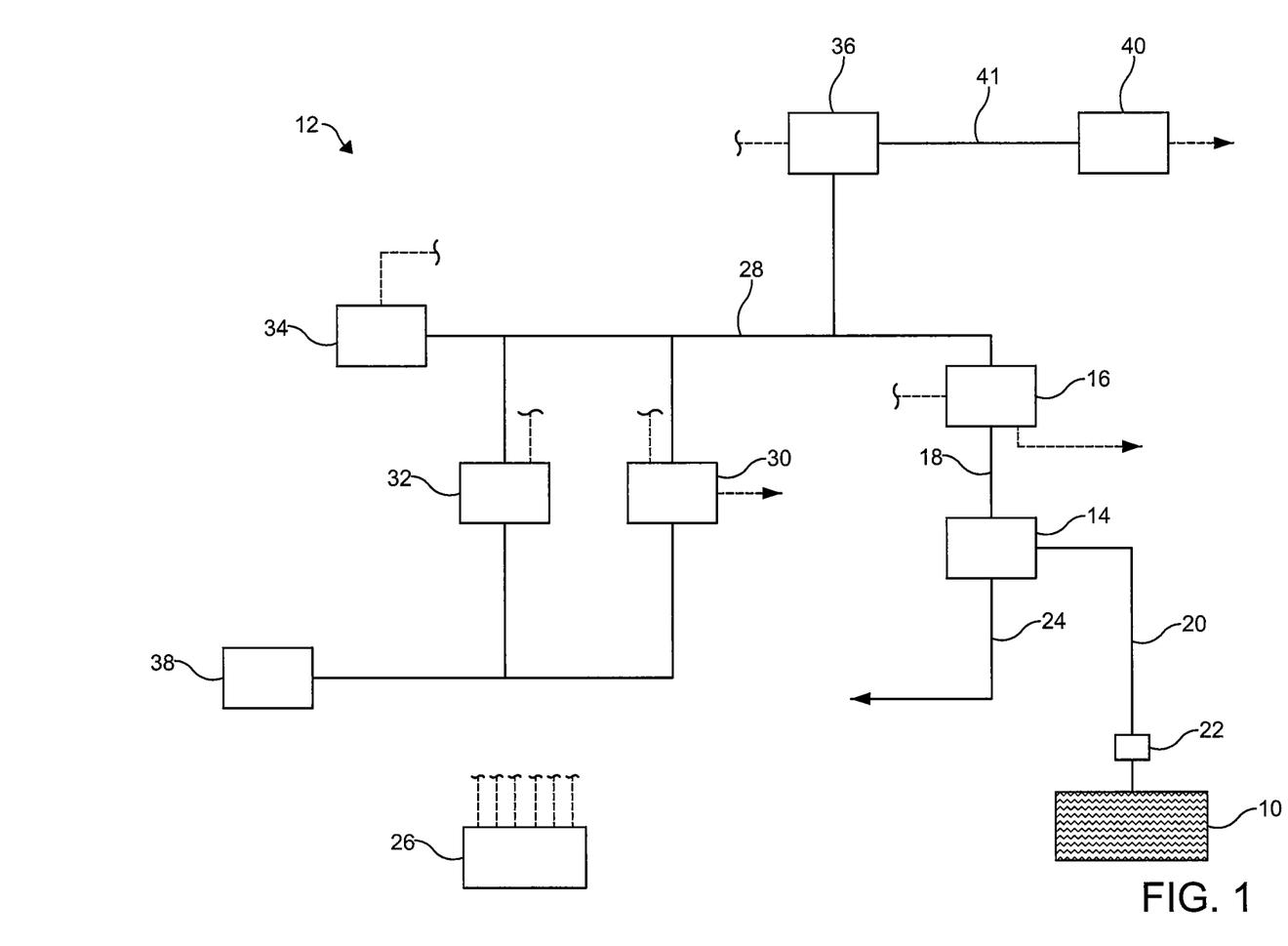
FIG. 1 is a schematic view of an embodiment of a tire inflation system in accordance with the invention.

Referring now to FIG. 1, the method is utilized to decrease the tire pressure of a tire 10. As used herein, "tire pressure" refers to a pressure of air or another fluid contained within the tire 10. Although the method will be described in relation to decreasing the tire pressure of only the one tire 10 and in FIG. 1 only the tire 10 is shown, it should be appreciated that the method can be utilized to decrease the tire pressures of a plurality of tires (not depicted), simultaneously or not.

The method is preferably utilized in or in conjunction with a tire inflation system 12 of a vehicle (not depicted). Advantageously, the method can be utilized with existing tire inflation systems. Further, the method may have applications to commercial and off-highway vehicles. Also, it would be understood by one of ordinary skill in the art that the embodiments described herein could have industrial, locomotive, military and aerospace applications. Preferably, the tire inflation system 12 is of the central tire inflation system (CTIS) variety.

The tire inflation system 12 comprises a first valve assembly 14. In an embodiment, the first valve assembly 14 is as described in WO 2015/017509, the entire disclosure of which is hereby incorporated by reference. The first valve assembly 14 facilitates the tire inflation system 12 in measuring the tire pressure, increasing the tire pressure, and decreasing the tire pressure. Also, the first valve assembly 14 decreases an amount of fluid turbulence in the tire inflation system 12, provides greater flexibility in configuring the tire inflation system 12, and facilitates accurate control of the tire pressure of the tire 10.

The first valve assembly 14 is in fluid communication with a channel valve assembly 16, the tire 10, and the atmosphere. The first valve assembly 14 is in fluid communication with the channel valve assembly 16 through a first fluid conduit 18 (hereinafter referred to as "supply conduit"). The supply conduit 18 is attached to and in fluid communication with the first valve assembly 14 and the channel valve assembly 16. The first valve assembly 14 is in fluid communication with the tire 10 through a second fluid conduit 20 (hereinafter referred to as "outlet conduit") and a wheel valve 22. The first valve assembly 14 is in fluid communication with the atmosphere through a third fluid conduit 24 (hereinafter referred to as "exhaust conduit").

Preferably, the channel valve assembly 16 is of the solenoid variety. However, it should be understood that the channel valve assembly may be another type of valve. The tire inflation system 12 illustrated in FIG. 1 shows one channel valve assembly 16. However, in other embodiments (not depicted), the tire inflation system may include a plurality of channel valve assemblies. In these embodiments, each channel valve assembly is in fluid communication with a respective first valve assembly and a respective tire. When energized and placed in an energized position by an electronic control unit 26 of the tire inflation system 12, the channel valve assembly 16 facilitates fluid communication between the first valve assembly 14 and a third fluid conduit 28 (hereinafter referred to as "control line"). The supply conduit 18 is in fluid communication with the first valve assembly 14 and a second valve assembly 30 (hereinafter referred to as "control valve assembly") via the channel valve assembly 16 and the control line 28. Thus, when energized, the channel valve assembly 16 enables fluid communication between the first valve assembly 14 and the control valve assembly 30.

The channel valve assembly 16 is in fluid communication with a supply valve assembly 32, the control valve assembly 30, a pressure sensor 34, and a deflate valve assembly 36 via the control line 28. The control line 28 is attached to and in fluid communication with the channel valve assembly 16 and the second valve assembly 30. The control line is also attached to and in fluid communication with the supply valve assembly 32, the pressure sensor 34, and the deflate valve assembly. When the channel valve assembly 16 is de-energized and placed in a de-energized position, the channel valve assembly 16 is in a closed position. When the channel valve assembly 16 is de-energized and in the closed position, fluid communication between the supply conduit 18 and the control line 28 is prohibited. However, it should be understood that the channel valve assembly may be controlled in a different manner.

Preferably, the supply valve assembly 32 and the control valve assembly 30 are of the solenoid variety. However, it should be appreciated that the supply valve assembly and control valve assembly may each be another type of valve. The supply valve assembly 32 is in fluid communication with an air supply 38 and the control line 28. The air supply 38 may comprise an air compressor (not depicted) and other components known in the art and is preferably attached to the vehicle.

When energized and placed in an energized position by the electronic control unit 26, the supply valve assembly 32 facilitates fluid communication between the air supply 38 and the control line 28. The control valve assembly 30 is of the 3 way variety. In an embodiment, the control valve assembly 30 is in fluid communication with the air supply 38, the control line 28, and the atmosphere. The control valve assembly 30 is utilized to introduce a bleed of air from the air supply 38 into the control line 28. When the control valve assembly 30 is placed in an energized position by the electronic control unit 26, the bleed of air is introduced into the control line 28. Thus, the control valve assembly 30 facilitates fluid communication between the air supply 38 and the control line 28. When de-energized and placed in a de-energized position by the electronic control unit 26, the control valve assembly 30 facilitates fluid communication between the control line 28 and the atmosphere.

The electronic control unit 26 is in communication with the channel valve assembly 16, the control valve assembly 30, the supply valve assembly 32, the pressure sensor 34 and the deflate valve assembly 36. The electronic control unit 26 operates the tire inflation system 12 in response to a set of predetermined instructions, which may also be referred to as software, or in response to an instruction from an operator of the vehicle. The electronic control unit 26 may receive input signals from the pressure sensor 34, a power supply (not depicted) and one or more additional sensors (not depicted) such as, for example, a load sensor and a speed sensor. The electronic control unit 26 may also receive input signals from an operator control device (not depicted). The electronic control unit 26 may include a microprocessor (not depicted) and a memory (not depicted) in which programming instructions are stored. The memory can also store identification codes, tire pressure records and/or user inputs over a period of time.

The electronic control unit 26 outputs signals to the valve assemblies 16, 30, 32, 36. The output signals may be electrical current. Electrical current can be received by a selected valve assembly 16, 30, 32, 36 to energize the valve assembly and place the valve assembly 16, 30, 32, 36 into an energized position. Similarly, electrical current can be removed from a valve assembly 16, 30, 32, 36 to de-energize the valve assembly and place the valve assembly 16, 30, 32, 36 into a de-energized position. The electronic control unit 26 may also output signals to a display device (not depicted). The display device may be included as a part of the operator control device or a freestanding device.

The pressure sensor 34 is in fluid communication with and monitors a fluid pressure within the control line 28. The pressure sensor 34 is also configured to communicate a signal relaying information about the fluid pressure within the control line 28 to the electronic control unit 26. The pressure sensor 34 may be referred to as a pressure transducer and may be conventional in the art.

Preferably, the deflate valve assembly 36 is of the solenoid variety. However, it should be appreciated that the deflate valve assembly 36 may be of another type of valve. The deflate valve assembly 36 is in fluid communication with the control line 28 and a pressure relief valve assembly 40. When energized and placed in an energized position by the electronic control unit 26, the deflate valve assembly 36 facilitates fluid communication between the control line 28 and the pressure relief valve assembly 40.

The pressure relief valve assembly 40 comprises a relief valve in communication with the deflate valve assembly 36 and the atmosphere. The pressure relief valve assembly 40 is configured to be placed in an open position when a pressure in a conduit 41 provided between the deflate valve assembly 36 and the pressure relief valve assembly 40 is greater than a predetermined pressure. When placed in the open position, the pressure relief valve assembly 40 facilitates fluid communication between the control line 28 and the atmosphere when the deflate valve assembly 36 is in the energized position.

The air supply 38 is utilized to open the wheel valve 22. The wheel valve 22 is movable from an open position to a closed position and vice versa. The wheel valve 22 allows the tire 10 to selectively communicate with the tire inflation system 12 via the outlet conduit 20.

Preferably, the tire pressure is equal to a target tire pressure. The target tire pressure can be selected to be a desired pressure. After the target tire pressure is selected, it is programmed into the electronic control unit 26. If it is determined that the tire pressure is less than the target tire pressure, the tire pressure can be increased. The tire pressure can be increased in accordance with the steps described in WO 2015/017509.

Similarly, if it is determined that the tire pressure is greater than the target tire pressure, the tire pressure can be decreased.

To decrease the tire pressure, the pressure sensor 34 measures the pressure of the air provided by the air supply 38. The pressure of the air provided by the air supply 38 is measured via the control line 28. In order to measure the pressure of the air provided by the air supply 38, the electronic control unit 26 places the control valve assembly 30 and the supply valve assembly 32 in the energized position, while the channel valve assembly 16 and the deflate valve assembly 36 remain in the de-energized position. With the control valve assembly 30 and the supply valve assembly 32 in the energized position, the pressure within the control line 28 substantially equalizes the pressure of the air provided by the air supply 38 and the electronic control unit 26 records the pressure within the control line 28 as measured by the pressure sensor 34. Information collected by the electronic control unit 26 regarding the pressure within the control line 28 is utilized by the electronic control unit 26 to determine the condition of the air supply 38, and may be used in determining whether the tire pressure can be increased or decreased by the tire inflation system 12.

Figure 2:
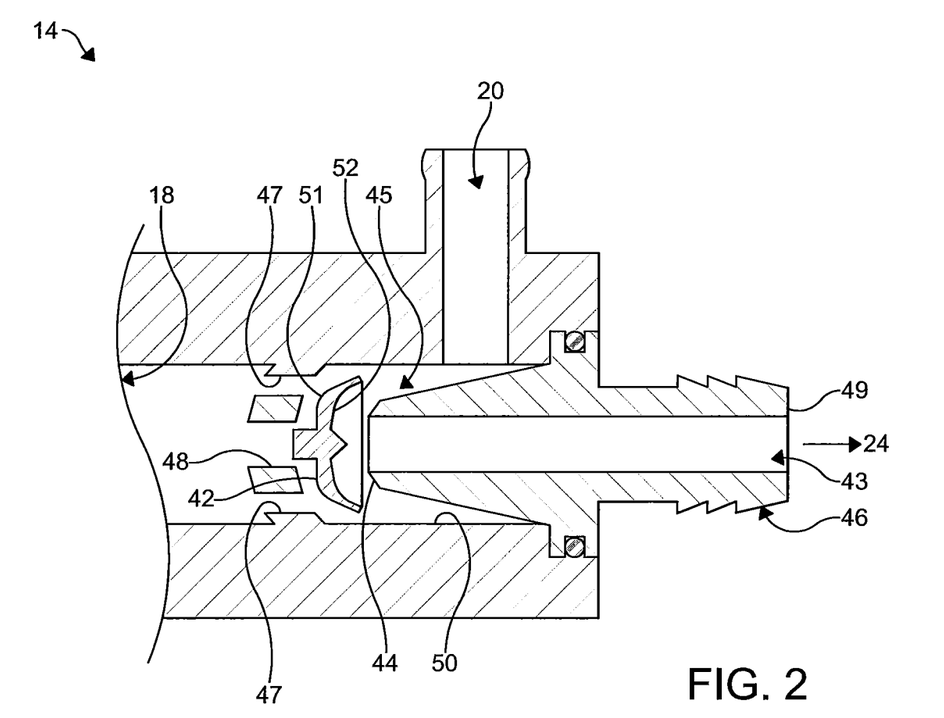
FIG. 2 depicts a cross-sectional view of an embodiment of a valve assembly of the tire inflation system of FIG. 1.

Next, with reference to both FIGS. 1 and 2, the tire pressure is determined. In order to determine the tire pressure, the electronic control unit 26 places the channel valve assembly 16 in the energized position, and pressurized air from the air supply 38 is directed to the supply conduit 18. The pressurized air from the air supply 38 directed to the supply conduit 18 causes a valve 42 to sealingly engage an exhaust stem 46 of the first valve assembly 14. The valve 42 sealingly engaging the exhaust stem 46 militates against fluid communication occurring between the supply conduit 18 and the exhaust conduit 24 through a cavity 43. As a valve cavity 45 is in fluid communication with the outlet conduit 20, the supply conduit 18 is in fluid communication with the outlet conduit 20 when the valve 42 sealingly is engaged with the exhaust stem 46. The pressurized air provided by the air supply 38 is then applied to the wheel valve 22, which opens in response to the pressurized air provided by the air supply 38. The above described sequence of events occurs in a relatively quick manner once the channel valve assembly 16 is placed in the energized position. Following the opening of the wheel valve 22, the electronic control unit 26 de-energizes the supply valve assembly 32, and the pressurized air within the control line 28 is of a pressure that substantially equalizes that of the tire pressure. Next, the pressure of the pressurized air within the control line 28 is measured utilizing the pressure sensor 34. The pressure sensor then sends a signal to the electronic control unit 26 indicative of the pressure measured and the electronic control unit 26 records the measured pressure of the pressurized air within the control line 28 as the tire pressure. Thus, the air supply 38 is utilized to determine the tire pressure and, if needed, open the wheel valve 22 so that the pressure of the air within the tire 10 can be measured.

If it is determined that the tire pressure is greater than the target tire pressure, the tire pressure can be decreased. It should be appreciated that decreasing the tire pressure may be performed independently of determining the tire pressure as described above.

Decreasing the tire pressure is performed through a multi-step process. To initiate decreasing the tire pressure, the electronic control unit 26 places each of the channel valve assembly 16, the control valve assembly 30, and the deflate valve assembly 36 into their energized position, while the supply valve assembly 32 is in its de-energized position. It is understood that the channel valve assembly 16 and the wheel valve 22 may be opened when the tire pressure is determined and may remain open to decrease the tire pressure. Alternately, it should be appreciated that the channel valve assembly 16 may be opened by the electronic control unit 26 to facilitate opening the wheel valve 22.

Next, as the pressure relief valve assembly 40 is in fluid communication with the control line 28, the pressure relief valve assembly 40 opens and pressurized air within the control line 28 is released to the atmosphere to reduce a pressure within the control line 28 to the predetermined pressure of the pressure relief valve 40. When the pressure within the control line 28 is lowered to the predetermined pressure, the valve 42 should unseat from the exhaust stem 46. The valve 42 unseats from the exhaust stem to enable fluid communication between the tire 10 and exhaust conduit 24. Enabling fluid communication between the tire 10 and the exhaust conduit 24 releases pressurized air from the tire 10.

When the valve 42 unseats from the exhaust stem 46, the valve 42 lifts off of and away from an inner end 44 of the exhaust stem 46. The valve 42 unseats from the exhaust stem 46 when a pressure applied to the valve 42 in a direction away from the exhaust stem 46 (towards supply ports 47) is greater than a pressure applied to the valve 42 in a direction towards the exhaust stem 46 (towards a second distal end 49 of the exhaust stem). The pressure applied to the valve 42 in a direction away from the exhaust stem 46 is caused by two forces: a decrease in pressure within the supply conduit 18 (which is applied to the outer surface 51 of the valve 42) caused by fluid communication between the control line 28 and the pressure relief valve assembly 40 and a force applied to an inner surface 52 of the valve 42 by a fluid entering the valve cavity 45 from the outlet conduit 20 as the tire pressure is being decreased.

When the tire pressure is being decreased, turbulence reducing protuberances on the exhaust stem 46 facilitate a more evenly distributed application of the air entering the valve cavity 45 from the outlet conduit 20 against the inner surface 52 of the valve 42. The more evenly distributed application of the fluid against the inner surface 52 of the valve 42 results in a more consistent unseating of the valve 42 from the exhaust stem 46, allows forces applied to the valve 42 when the tire pressure is being decreased to be more easily balanced, allows a greater flow rate of air through the valve cavity 45, provides greater flexibility in configuring an orientation of the outlet conduit 20 with respect to the exhaust stem 46 and the valve cavity 45, and facilitates a more accurate control of the tire pressure by the electronic control unit 26.

When the wheel valve 22 is open, pressurized air from the tire 10 is directed to and enters the first valve assembly 14. From the first valve assembly 14, the pressurized air is directed to the atmosphere via the exhaust conduit 24. While the tire pressure is being decreased, the wheel valve 22 is maintained in the open position for a predetermined period of time. The wheel valve 22 is maintained in the open position by providing a predetermined (back) pressure in the outlet conduit 20.

As described above, when the tire pressure is being decreased, the valve 42 lifts off of and away from an inner end 44 of an exhaust stem 46. Preferably, when the valve 42 lifts off of the exhaust stem 46 it is received by a guide aperture 48 and forms a seal against an inner wall 50 of the first valve assembly 14 which allows the pressurized air from the tire 10 to be directed to atmosphere via the first valve assembly 14 and the exhaust conduit 24. Under these conditions, the tire pressure can be decreased in accordance with the steps described above and in WO 2015/017509.

However, if the valve 42 is old or cold such as, for example, at a temperature of −30° C. or less, a fluid tight seal between the valve 42 and the inner wall 50 may not be provided. Additionally, if the tire pressure is relatively low such as, for example, being of a pressure of less than 30 psig, the seal between the valve 42 and the inner wall 50 may not be provided. If the seal is not provided, then pressurized air from the tire 10 accumulates above the valve 42 in the supply conduit 18. The pressurized air that accumulates in the supply conduit 18 pushes the valve 42 back toward and onto the inner end 44 of the exhaust stem 46 which prevents the pressurized air from the tire 10 from being directed to the atmosphere via the exhaust conduit 24. Thus, under these conditions, decreasing the tire pressure is prevented.

In order to determine if the valve 42 is operating properly and the seal between the valve 42 and the inner wall 50 is being formed, a threshold target pressure is selected for the supply conduit 18. When the tire pressure is being decreased, the pressure of the air in the supply conduit 18 is measured with the channel valve assembly 16 in the energized position and by measuring the pressure of the air in the control line 28 utilizing the pressure sensor 34. The threshold target pressure for the supply conduit 18 can be, for example, equal to a nominal pressure value plus a first additional pressure value. In an embodiment, the nominal pressure value is equal to the predetermined pressure for placing the pressure relief valve assembly 40 into the open position. The first additional pressure value can vary between embodiments of the invention. If, after a predetermined period of time, the pressure in the supply conduit 18 is measured to be greater than or equal to the threshold target pressure for the supply conduit 18, then the control valve assembly 30 is placed into the de-energized position. In an embodiment, the predetermined period of time for determining whether the pressure in the supply conduit 18 is greater than or equal to the threshold target pressure for the supply conduit 18 is about 2 seconds.

In certain embodiments, the first additional pressure value is equal to 4 psi. Thus, in embodiments where the nominal pressure value is equal to the predetermined pressure for placing the pressure relief valve assembly 40 into the open position and the first additional pressure value is 4 psi, if the pressure of the air in the supply conduit 18 was equal to the predetermined pressure for placing the pressure relief valve assembly 40 into the open position plus 5 psi, then the pressure measured in the supply conduit 18 is greater than the threshold target pressure for the supply conduit 18. Since, in this example, the pressure measured in the supply conduit 18 is greater than the selected threshold target pressure for the supply conduit 18, the control valve assembly 30 is placed into the de-energized position.

Placing the control valve assembly 30 into the de-energized position, vents the pressurized air in the supply conduit 18 and control line 28 by directing the pressurized air to atmosphere via the control valve assembly 30. Venting the pressurized air in the supply conduit 18 decreases the pressure of the air accumulated above the valve 42 which allows the valve 42 to lift off of and move away from the exhaust stem 46 as is desired when the tire pressure is being decreased. As the pressure in the supply conduit 18 is vented, the pressure of the air in the supply conduit 18 is monitored via the control line 28 utilizing the pressure sensor 34. If the pressure in the supply conduit 18 is measured to be less than or equal to a minimum target pressure for the supply conduit 18, then the control valve assembly 30 is placed back into the energized position. In an embodiment, the minimum target pressure for the supply conduit 18 is equal to the nominal pressure value and a pressure tolerance offset value. In this embodiment, the nominal pressure value can be equal to the predetermined pressure for placing the pressure relief valve assembly 40 into the open position. The pressure tolerance offset value may be equal to, for example, 1 psi. Thus, in these embodiments, if the pressure in the supply conduit 18 was measured to be less than or equal to the predetermined pressure for placing the pressure relief valve assembly 40 into the open position minus 1 psi, then the pressure measured in the supply conduit 18 is less than or equal to the minimum target pressure for the supply conduit 18. Since, in this example, the pressure measured in the supply conduit 18 is less than or equal to the selected minimum target pressure, the control valve assembly 30 is placed back into the energized position.

Placing the control valve assembly 30 into the energized position prevents the pressurized air in the supply conduit 18 from being directed directly to the atmosphere via the control valve assembly 30 and introduces the bleed of air from the air supply 38 into the supply conduit 18 via the control line 28 and channel valve assembly 16. The bleed of air provides pressurized air which compensates for leakage that may occur in certain portions of the tire inflation system 12 and helps to maintain the valve 42 in a predetermined position relative to the exhaust stem 46 so that the (back) pressure necessary to maintain the wheel valve 22 in the open position is provided.

As noted above, placing the control valve assembly 30 back into the energized position allows pressurized air to re-accumulate in the supply conduit 18. If the seal between the valve 42 and the inner wall 50 does not form, the pressurized air accumulates in the supply conduit 18 above a maximum target pressure. If the pressurized air re-accumulates in the supply conduit 18 above the maximum target pressure, then the valve 42 is urged back toward the exhaust stem 46. If pressurized air re-accumulates in the supply conduit 18 above the maximum target pressure, the control valve assembly 30 can be placed in the de-energized position again to vent the pressurized air in the supply conduit 18 via the control line 28 as described above. The maximum target pressure for the supply conduit 18 can be selected to be a predetermined pressure. The maximum target pressure for the supply conduit 18 can be selected to be, for example, equal to the nominal pressure value plus a second additional pressure value. In this embodiment, the nominal pressure value can be equal to the predetermined pressure for placing the pressure relief valve assembly 40 into the open position. The second additional pressure value can vary between embodiments of the invention. However, in an embodiment, the second additional pressure value is equal to 1 psi.

The steps of measuring the pressure of the air in the supply conduit 18, de-energizing the control valve assembly 30, and energizing the control valve assembly 30 can be repeated for a predetermined number of cycles to maintain the pressure measured in the supply conduit 18 between maximum target pressure for the supply conduit 18 and the minimum target pressure for the supply conduit 18. Also, those steps can be repeated as necessary until the seal is formed. For example, the control valve assembly 30 may be placed into the energized position and placed into the de-energized position 1 or more times in order to establish a fluid-tight seal between the valve 42 and inner wall 50 of the first valve assembly 14. In other embodiments, the control valve assembly 30 is placed into the energized position and placed into the de-energized position 140 times or less in order to form a seal between the valve 42 and inner wall 50. Preferably, the control valve assembly 30 is placed into the energized position and placed into the de-energized position 35 times in order to form a seal between the valve 42 and inner wall 50.

It is believed that the steps of de-energizing and energizing the control valve assembly 30 to move the valve 42 toward and away from the exhaust stem 46 enables the valve 42 to increase its pliancy when the valve 42 is old and/or cold. After the pliancy of the valve 42 has been sufficiently increased, a seal between the valve 42 and inner wall 50 of the first valve assembly 14 can be formed. Once the aforementioned seal is formed, the tire pressure can be decreased as described above.

After a predetermined amount of time, the electronic control unit 26 may de-energize the deflate valve assembly 36 to prevent the tire pressure from being further decreased. The predetermined amount of time may be based on at least the pressure within the control line 28, the pressure within the tire 10 prior to the tire pressure being decreased, the desired target tire pressure and auto-learning from one or more prior tire pressure decreases. Following the deflate valve assembly 36 being de-energized, the tire pressure may be determined again as described above to ensure that the tire pressure is equal to the target tire pressure.

EXAMPLE

The following example is presented solely for the purpose of further illustrating and disclosing the embodiments of the present method of decreasing tire pressure.

Figure 3:
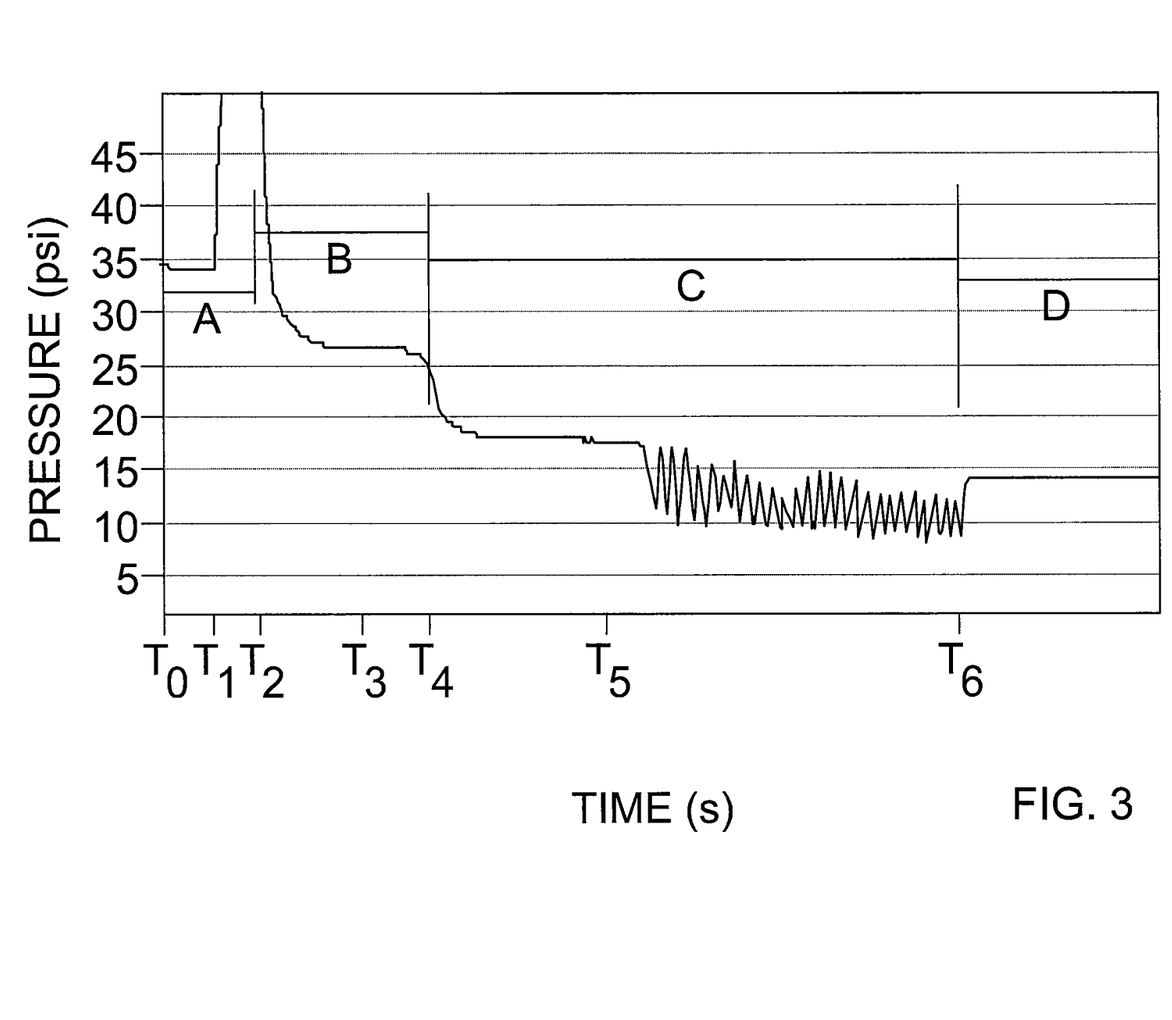
FIG. 3 depicts a graph of pressure versus time related to an embodiment of the method for decreasing tire pressure.

FIG. 3 illustrates graphically an embodiment of the method where the tire pressure was decreased even though a fluid tight seal between the valve and the inner wall was not initially formed. In the embodiment illustrated by FIG. 3, a target tire pressure for a tire was selected and pressure relief valve assembly was set to 12 psi.

At time $T_0$, the tire pressure of a tire was measured. The tire pressure was measured by placing a channel valve assembly into its energized position, opening a wheel valve, and directing pressurized air from a tire to the control line. The pressure sensor measured the pressure of the pressurized air in the control line as described above. The pressure of the pressurized air in the control line was about 34 psi. The tire pressure of 34 psi was greater than the target tire pressure. Since the tire pressure was greater than the target tire pressure, it was determined that the tire pressure should be decreased.

At time $T_1$, the channel valve assembly, the control valve assembly, and the supply valve assembly were placed into their energized positions and the wheel valve was open. At time $T_2$, the channel valve assembly and the control valve assembly were maintained in their energized position, the deflate valve assembly was placed into its energized position, and the supply valve assembly was placed into its de-energized position. With the valve assemblies listed above in the positions described for time $T_2$ and the wheel valve open, pressurized air from the tire was directed to and entered the first valve assembly during the time period labelled as "B" in FIG. 3.

A threshold target pressure was selected for the supply conduit. The threshold target pressure was selected to be equal to a nominal pressure value of 12 psi plus a first additional pressure value of 4 psi or the threshold target pressure was 16 psi. After a predetermined period of time and at time $T_3$, the pressure of the air in the supply conduit was measured by measuring the pressure of the air in the control line. In the embodiment illustrated in FIG. 3, the predetermined period of time was about 2 seconds and the pressure in the supply conduit was measured to be about 27 psi. Since the pressure in the supply conduit was measured to be about 27 psi and was greater than the threshold target pressure of 16 psi, it was determined that the tire pressure was not being decreased because a fluid tight seal between the valve and the inner wall was not formed.

Therefore, at time $T_4$, the control valve assembly was placed into the de-energized position. Placing the control valve assembly into the de-energized position, vented the pressurized air in the supply conduit and control line as described above. As the pressure in the supply conduit and the control line was being vented, the pressure of the air in the supply conduit was monitored as described above.

A minimum target pressure was selected for the supply conduit. The minimum target pressure was selected to be equal to the nominal pressure value of 12 psi minus a pressure tolerance offset value of 1 psi or the minimum target pressure was 11 psi. Also, a maximum target pressure was selected for the supply conduit. The maximum target pressure was selected to be equal to the nominal pressure value of 12 psi plus an additional pressure value of 1 psi or the maximum target pressure was 13 psi. If, during the time period labelled as "C" in FIG. 3, the pressure in the supply conduit was measured to be less than the minimum target pressure for the supply conduit, then the control valve assembly was placed back into the energized position. However, if, during the time period labelled as "C" in FIG. 3, the pressure in the supply conduit was measured to be greater than or equal to the maximum target pressure for the supply conduit, then the control valve assembly was placed back into the de-energized position.

The steps of measuring the pressure of the air in the supply conduit, de-energizing the control valve assembly, and energizing the control valve assembly were repeated for a predetermined number of cycles to maintain the pressure measured in the supply conduit between maximum target pressure for the supply conduit and the minimum target pressure for the supply conduit. In the example illustrated by FIG. 3 and beginning at time $T_5$ and ending at time $T_6$, the control valve assembly was placed into the energized position and placed into the de-energized position 28 times.

Beginning at time $T_6$ through the time period labelled as "D" in FIG. 3, the control valve assembly was placed back into the energized position and the pressure of the air in the supply conduit was measured by measuring the pressure of the air in the control line. As is shown in FIG. 3, the pressure in the supply conduit was measured to be about 14 psi. Since the pressure in the supply conduit was measured to be about 14 psi and was less than the threshold target pressure of 16 psi, it was determined that the tire pressure was now decreasing and that a fluid tight seal between the valve and the inner wall was formed.

In accordance with the provisions of the patent statutes, the present invention has been described in what is considered to represent its preferred embodiments. However, it should be noted that the invention can be practiced otherwise than as specifically illustrated and described without departing from its spirit or scope.

The invention claimed is:

1. Method of decreasing tire pressure, comprising:
opening a wheel valve to allow pressurized air from a tire to be directed to a first valve assembly and to atmosphere;
selecting a target pressure for a fluid conduit, wherein the fluid conduit is in fluid communication with the first valve assembly and a second valve assembly;
measuring a pressure in the fluid conduit,
wherein if the measured pressure is greater than the target pressure, then the second valve assembly is de-energized and if the measured pressure is less than the target pressure, then the second valve assembly is energized; and
venting pressurized air in the fluid conduit to atmosphere via the second valve assembly when the second valve assembly is de-energized.

2. The method of claim 1, further comprising unseating a valve of the first valve assembly to enable fluid communication between the tire and an exhaust conduit.

3. The method of claim 2, wherein the pressurized air directed to the first valve assembly is directed to atmosphere via the exhaust conduit.

4. The method of claim 2, wherein the valve unseats from an exhaust stem when a pressure applied to the valve in a direction away from the exhaust stem is greater than a pressure applied to the valve in a direction towards the exhaust stem.

5. The method of claim 1, further comprising communicating pressurized air from an air supply to the fluid conduit via the second valve assembly when the second valve assembly is energized.

6. The method of claim 1, further comprising measuring a pressure of an air supply utilizing a pressure sensor in fluid communication with the fluid conduit.

7. The method of claim 1, wherein the target pressure is a range of pressures.

8. The method of claim 1, wherein the second valve assembly is de-energized and energized to establish a seal between a valve and an inner wall of the first valve assembly.

9. The method of claim 1, further comprising selecting a minimum target pressure and, with the second valve assembly de-energized, measuring the pressure in the fluid conduit and, if the measured pressure is less than the minimum target pressure, then energizing the second valve assembly.

10. The method of claim 9, wherein the minimum target pressure is equal to a nominal pressure value minus a pressure tolerance offset value.

11. The method of claim 1, further comprising providing a pressure relief valve assembly in fluid communication with the fluid conduit.

12. The method of claim 11, wherein the pressure relief valve assembly is in fluid communication with the fluid conduit when a deflate valve assembly is energized.

13. The method of claim 1, further comprising energizing a channel valve assembly to enable fluid communication between the first valve assembly and the second valve assembly.

14. The method of claim 1, wherein the fluid conduit comprises a first fluid conduit and a control line, the first fluid conduit being attached to the first valve assembly and a channel valve assembly and the control line being attached to the second valve assembly and the channel valve assembly.

15. The method of claim 1, further comprising selecting a target tire pressure for a tire and determining if a tire pressure of the tire is greater than the target tire pressure.

16. Method of decreasing tire pressure, comprising:
opening a wheel valve to allow pressurized air from a tire to be directed to a first valve assembly and to atmosphere;
selecting a target pressure for a fluid conduit, wherein the fluid conduit is in fluid communication with the first valve assembly and a second valve assembly; and
measuring a pressure in the fluid conduit,
wherein if the measured pressure is greater than the target pressure, then the second valve assembly is de-energized and if the measured pressure is less than the target pressure, then the second valve assembly is energized, and wherein the pressure in the fluid conduit is measured when the second valve assembly is energized.

17. The method of claim 16, wherein the measured pressure is greater than the target pressure and the second valve assembly is de-energized.

18. Method of decreasing tire pressure, comprising:
opening a wheel valve to allow pressurized air from a tire to be directed to a first valve assembly and to atmosphere;
selecting a target pressure for a fluid conduit, wherein the fluid conduit is in fluid communication with the first valve assembly and a second valve assembly;
measuring a pressure in the fluid conduit,
wherein if the measured pressure is greater than the target pressure, then the second valve assembly is de-energized and if the measured pressure is less than the target pressure, then the second valve assembly is energized; and energizing a supply valve assembly and the second valve assembly to provide pressurized air from an air supply to open the wheel valve.

* * * * *